E. N. TRUMP.
FILTERING AND DRYING APPARATUS.
APPLICATION FILED FEB. 17, 1896.
963,186.
Patented July 5, 1910.
2 SHEETS—SHEET 1.
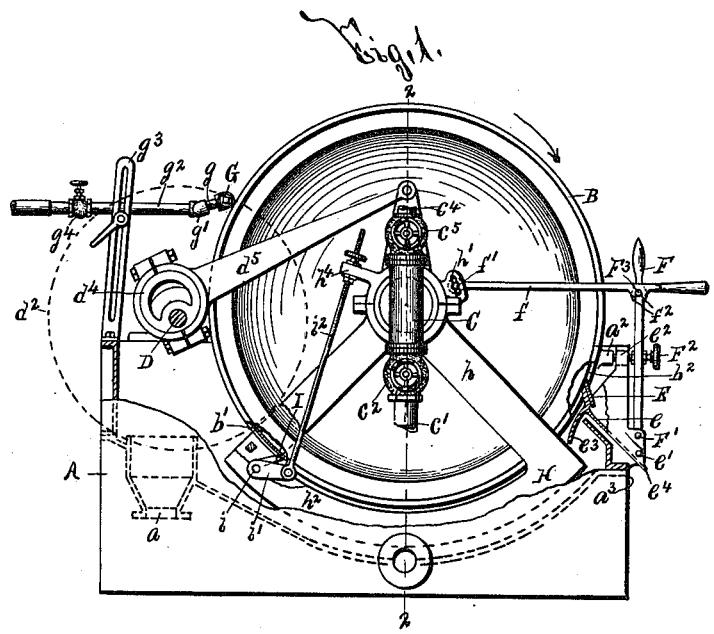
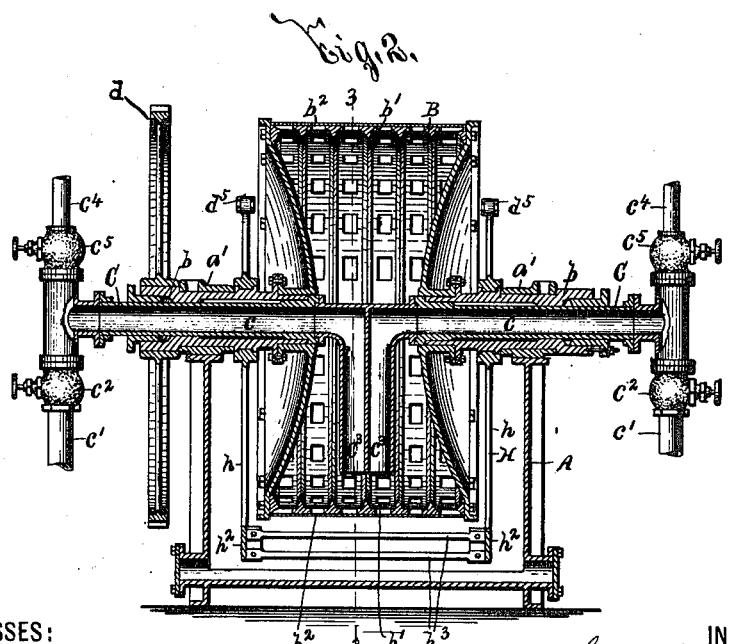
WITNESSES:
H. C. Chase,
Frank J. Brewer.
INVENTOR
Edward N. Trump,
BY
Hoyt Parsons.
ATTORNEYS.

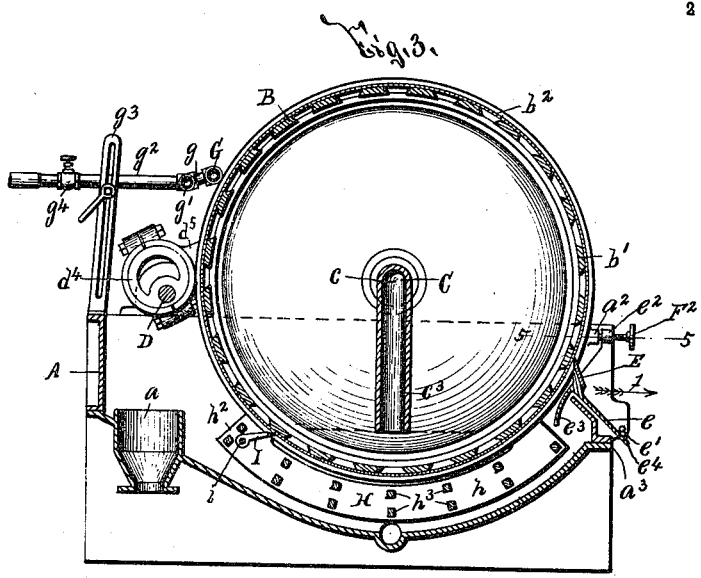
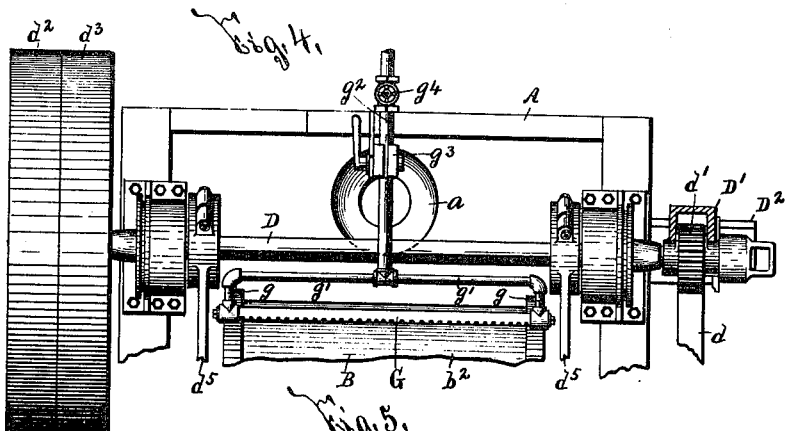
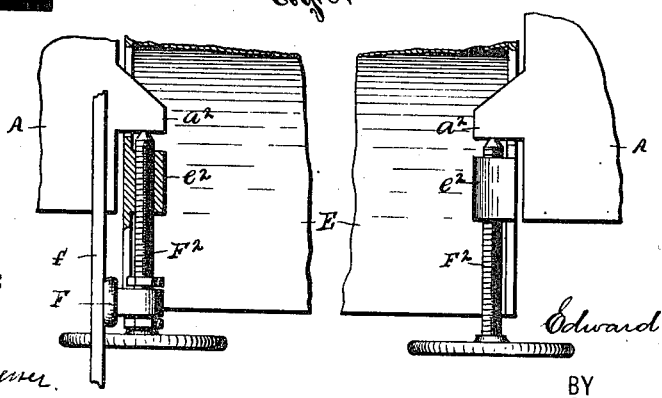

UNITED STATES PATENT OFFICE.

EDWARD N. TRUMP, OF SYRACUSE, NEW YORK, ASSIGNOR TO THE SOLVAY PROCESS COMPANY, OF SOLVAY, NEW YORK, A CORPORATION OF NEW YORK.

FILTERING AND DRYING APPARATUS.

963,186.  Specification of Letters Patent.  Patented July 5, 1910.

Application filed February 17, 1896. Serial No. 579,476.

*To all whom it may concern:*

Be it known that I, EDWARD N. TRUMP, of Syracuse, in the county of Onondaga, in the State of New York, have invented new and useful Improvements in Filtering and Drying Apparatus, of which the following, taken in connection with the accompanying drawing, is a full, clear, and exact description.

My invention has for its object the production of an apparatus for removing a precipitate from the mother liquor and drying the same, which is particularly adapted for the manufacture of bicarbonate of soda, and which requires a minimum amount of attention, and is capable of producing a maximum amount of material in a given time; and to this end it consists in the combinations and constructions hereinafter set forth and claimed.

In describing this invention, reference is had to the accompanying drawing, forming a part of this specification, in which like letters designate corresponding parts in all the views.

Figure 1 is an elevation, partly in section, of my improved drying apparatus. Figs. 2 and 3 are vertical sections, taken, respectively, on line 2—2, and 3—3, Figs. 1 and 2. Fig. 4 is a top plan of one end of my improved drying apparatus; and Fig. 5 is a detail transverse section, partly in elevation, taken on line 5—5, Fig. 3.

My present invention is provided with various means which prevent undue clogging of the drying or filtering surface, remove the material from the perforations or interstices of said surface, thoroughly wash the drying or filtering surface, agitate the material to be dried, and insure its adhesion to the filtering body in a substantially uniform layer.

A is a receptacle of any desired form, size, and construction into which is inserted by any suitable means, not necessary to herein illustrate or describe, the moist or fluent material, as a mother liquor in which the precipitate or other matter to be obtained and dried is suspended. The receptacle A is preferably provided with an overflow $a$ which may be dispensed with, if desired.

B is a filtering body of any desirable form, size, and construction, by which the matter to be obtained and dried, as bicarbonate of soda, is carried out of the mother liquor, said body having a portion of its surface movable into and out of the moist or fluent material in the receptacle A, and C is any suitable means for subjecting one side of said surface to a pressure different from that on the opposite side thereof and causing the bicarbonate to adhere to the outer side of said portion of the body and to maintain the same on said portion when the body has been moved to bring said portion out of the liquor.

The body B preferably consists of a revoluble cylinder formed with closed end-walls having projecting trunnions $b\ b$ journaled in bearings $a'\ a'$, and a perforated peripheral drying or filtering surface $b'$ of any desirable construction, which is usually surrounded by a perforated ring $b^2$ formed of suitable material. The means C preferably consists of a conduit or passage $c$ opening into the interior of the body B, for subjecting the inner side of its surface $b'$ to a pressure lower than that on the exterior of said surface, and a second conduit $c'$ which is provided with a valve $c^2$ and is connected to the conduit or passage $c$ and to a suitable vacuum pump not necessary to herein illustrate and describe. I preferably use two conduits or passages $c$ which generally extend through the trunnions $b, b$, are formed with downturned ends $c^3$ arranged adjacent to each other, and are each connected to conduits $c'$.

The filtering body or carrier B may be revolved by any suitable driving mechanism and is here illustrated as connected by gears $d\ d'$ to a driving shaft D which is provided with tight and loose driving pulleys $d^2\ d^3$. The gear $d'$ is so constructed that the number of its teeth is not a submultiple of the number of the teeth of the gear $d$, and said gear $d'$ is preferably moved lengthwise on the shaft D out of engagement with the gear $d$, in order that the filtering body may remain stationary without stopping the movement of the agitator presently described, which is connected to the shaft D. Any suitable means may be used for moving the gear $d'$ endwise on the shaft D as a yoke D' movable laterally on a guide D²; but as said yoke and guide form no part of my present invention, it is unnecessary to herein specifically illustrate and describe the same. The dried material is removed from the filtering body B by a knife E which may be stationary, if desired, although it is preferably moved constantly and automatically toward and away from the driving or filtering surface of said body.

The knife E is preferably mounted on a support $e$ pivoted at $e'$ to the wall of the receptacle A and provided with suitable adjusters $F^2$ which are movable in lugs $e^2$ projecting from the support $e$, and engage step-shoulders $a^2$ formed upon said receptacle A for preventing undue approach of the knife E to the drying or filtering surface, $b'$. Said knife E is also provided with a shield $e^3$ extending laterally over the adjacent edge of the receptacle A beyond the edge of the knife E adjacent to the filtering body. When the drying or filtering surface of the body B is being washed, as presently described, the knife support $e$ is rocked from its normal position in the direction indicated by arrow 1, Fig. 3, until a shoulder $e^4$ thereon engages a stop-face $a^3$, and the shield $e^2$ then operates to direct to the interior of the receptacle A any material dropped thereupon.

The means for continuously and automatically moving the knife E toward and away from the drying or filtering surface of the body B may be of any desirable form, size, and construction, but preferably consists of an arm F and a lever $f$ which connect the support $e$ to the frame $h$ of an agitator, presently described, for the material to be dried. The arm F is pivoted at $F'$ to the lower end of the knife-support $e$ and is loosely connected to one side of its pivot to one of the adjusters $F^2$ so as to slightly move lengthwise of said adjuster. One end of the lever $f$ is mounted on a pivot $f'$ which is secured in the slot $h'$ formed in the frame $h$ of the agitator, presently described; and said lever is provided at its free end with shoulders $f^2$ for detachably engaging a shoulder $F^3$ projecting from the adjacent end of the arm F. The agitator frame $h$ is constantly actuated as presently described, and, consequently, the arm F and the lever $f$ connecting the knife-support to said frame effect a continual rocking of the knife-support. The knife E is thus constantly and automatically moved toward and away from the drying or filtering surface $b'$, and removes the material therefrom in corrugations which are rarely coincident owing to the ratio previously pointed out of the number of teeth in the gears $d$ $d'$. Consequently the liability of the formation of a glazed ring or crust of material upon the drying or filtering surface of the body B is greatly reduced.

Although the knife E is continuously moved toward and away from the drying or filtering surface of the body B it is advisable to occasionally eject the material from the perforations or interstices of said surface. My improved drying apparatus is therefore provided with conduits $c^4$ which are formed with suitable valves $c^5$ are connected to a suitable pressure pump or other device unnecessary to herein illustrate and describe and discharge a suitable fluid as air into the conduits $c$ for subjecting the inner side of the surface $b'$ to a pressure higher than that to which said surface is subjected during the operation of the filtering body. This higher pressure discharges the material from the perforations or interstices of the surface $b'$, and during this operation the valves $c^2$ are closed, the knife-support $e$ is swung backwardly from the body B, and the shield $e^2$ operates, as previously described, to deflect to the interior of the receptacle A any material dropped thereupon.

After the material is ejected from the perforations or interstices of the surface $b'$, it is usually advisable to thoroughly wash or clean said surface, and, consequently my improved apparatus is provided with suitable means for effecting this operation. This means preferably consists of a perforated conduit G extending transversely across and above one side of the body B and having its opposite ends connected to inlet-pipes $g$ $g$ which receive the washing fluid and are connected by a branch pipe $g'$ to a feed-pipe $g^2$ mounted on any suitable support $g^3$ and provided with a valve $g^4$. It is often advisable when drying certain materials, as bicarbonate of soda, to wash the material adhering to the surface $b'$ before the same is dried, in order to obviate its contamination by salts in solution in the mother-liquor, and in that event the conduit G constantly discharges a suitable washing fluid, as pure water, upon the material adhering to said surface $b'$. The feeding chamber of conduit G may also be used for discharging any suitable solution upon the material adhering to the surface $b'$ when it is desired to mix another material therewith.

The material to be dried may be agitated by any suitable means, here illustrated as an agitator H consisting of an oscillating frame H, previously mentioned, usually mounted on the trunnions $b$ or the bearings supporting said trunnions, longitudinal bars $h^2$ arranged concentric with the surface $b'$ between said surface and the adjacent wall of the receptacle A, and cross-bars $h$ interposed, one above and in advance of the other, between the bars $h'$ and movable in proximity to the surface $b'$ in a plane substantially parallel with the adjacent face thereof. The agitator H is preferably actuated by eccentrics $d^4$ mounted on the shaft D, previously described, and connected by links $d^5$ to the frame $h$. Said agitator preferably supports a gage I which removes any excess of material from the surface $b'$, and is preferably mounted upon a pivot $i$ provided with an arm $i'$ connected to one end of a rod $l^2$. The opposite end of the rod $l^2$ is adjustable lengthwise in a lug $h$ upon the agitator frame $h$ for rocking the gage I on its pivot $i$ and governing the amount of the excess of adhesive material removed from the surface $b'$.

The operation of my improved drying apparatus will now be readily perceived upon reference to the foregoing description and the accompanying drawing, and it will be particularly noted that I do not herein limit myself to the exact construction and arrangement of any of the component parts thereof as the same may be materially varied without departing from the spirit of my invention.

What I claim is:—

1. A drying apparatus comprising a receptacle for receiving the moist material to be dried, a cylindrical filtering body having a portion of its filtering surface movable into engagement with said moist material, a conduit opening from one side of said surface for subjecting the same to a pressure different from that on the opposite side thereof, and thereby maintaining a portion of the material on said opposite side and drying the same, means for removing the material from said opposite side, and means for washing the material maintained on said opposite side before its removal therefrom, substantially as and for the purpose described.

2. A drying apparatus comprising a receptacle for receiving the moist material to be dried, a filtering body having a portion of its filtering surface movable into engagement with said moist material, a pipe opening from one side of said surface for subjecting the same to a pressure different from that on the opposite side thereof, and thereby maintaining a portion of the material on said opposite side and drying the same, means for removing the material from said opposite side, a perforated conduit extending across said opposite side and located to discharge upon that portion of the filtering body moving toward the removing means, and means for discharging a fluid within the pipe, substantially as and for the purpose set forth.

3. A drying apparatus comprising a receptacle for receiving the material to be dried, a filtering body having a portion of its surface movable into engagement with the material, a knife for removing the material from said surface, and means for positively moving the knife toward and away from the filtering body, substantially as and for the purpose specified.

4. A drying apparatus comprising a receptacle for receiving the material to be dried, a revoluble filtering body having a portion of its surface movable into engagement with the material, a knife for removing the material from said surface, and driving means for simultaneously revolving the filtering body and moving the knife toward and away from said body, substantially as and for the purpose described.

5. A drying apparatus comprising a receptacle for receiving the material to be dried, a filtering body having a portion of the surface movable into engagement with the material, a knife for removing the material from said surface, means for automatically moving the knife toward and away from the filtering body, and means for limiting the movement of the knife toward said body, substantially as and for the purpose set forth.

6. A drying apparatus comprising a receptacle for receiving the material to be dried, a filtering body having a portion of its surface movable into engagement with the material, a knife for removing the material from said surface, and a pair of gears connected to said knife for moving the same toward and away from the filtering body, said gears being so constructed that the number of the teeth of one is not a submultiple of the number of the teeth of the other, substantially as and for the purpose specified.

7. A drying apparatus comprising a receptacle for receiving the material to be dried, a filtering body having a portion of its surface movable into engagement with the material, means for subjecting one side of said surface to a pressure different from that on the opposite side thereof, a knife for removing the material from said opposite side of the filtering surface, a movable support for the knife, and means for actuating the support and moving the knife toward and away from said filtering surface for removing the material therefrom, substantially as and for the purpose described.

8. A drying apparatus comprising a receptacle for receiving the material to be dried, a filtering body having a portion of its surface movable into engagement with the material, a knife for removing the material from said surface, and a movable support for the knife having a shield extending laterally beyond the face of the knife adjacent to the filtering body, substantially as and for the purposes set forth.

9. A drying apparatus comprising a receptacle for receiving the material to be dried, a filtering body having a portion of its surface movable into engagement with the material, a knife for removing the material from said surface, a movable support for the knife, an actuating arm adjustably connected to the support, and means for automatically operating the actuating arm, substantially as and for the purpose described.

10. A drying apparatus comprising a receptacle for receiving the material to be dried, a filtering body having a portion of its surface movable into engagement with the material, a knife for removing the material from said surface, a movable support for the knife, and an actuating arm pivoted to the support and loosely connected thereto at one side of its pivot, substantially as and for the purpose set forth.

11. A drying apparatus comprising a receptacle for receiving the material to be dried, a filtering body having a portion of its surface movable into engagement with the material, a knife for removing the material from said surface, a movable support for the knife, provided with an actuating arm, and a lever detachably connected to the actuating arm for operating said support, substantially as and for the purpose specified.

12. A drying apparatus comprising a receptacle for receiving the material to be dried, a filtering body having a portion of its surface movable into engagement with the material, a knife for removing the material from said surface, a movable frame, and a lever adjustably connected to the frame, and connected to the knife for moving the same toward and away from said surface, substantially as and for the purpose described.

13. A drying apparatus comprising a receptacle for receiving the material to be dried, a filtering body having a portion of its surface movable into engagement with the material in the receptacle, a knife for removing the material from said surface, a movable support for the knife, an adjuster for varying the position of said support, and means for positively moving said support and forcing the knife toward and away from the filtering body, substantially as and for the purpose set forth.

14. A drying apparatus comprising a receptacle for receiving the moist material to be dried, a filtering body partially surrounded by a drying fluid and having a portion of its surface movable into engagement with said material, means for withdrawing a given amount by weight of the liquid in the moist material and of the drying fluid from the inner side of the filtering surface at a greater speed than a similar amount of said liquid and drying fluid feeds through the filtering surface from the outer side thereof and thereby maintaining a portion of the material on said filtering surface and drying said portion of the material, an agitator movable in the moist material in the receptacle, in a plane in proximity to the surface of the filtering body in contact with said material, and means for removing the dried material from the filtering surface of said filtering body, substantially as and for the purpose specified.

15. A drying apparatus comprising a receptacle for receiving the material to be dried, a revoluble filtering body having a portion of its periphery movable into engagement with the material, an agitator movable in opposite directions in the moist material in the receptacle in a plane substantially concentric with the surface of the filtering body in contact with said material and in proximity to said surface, and a frame for supporting the agitator, said frame being movable on substantially the same axis as the filtering body, substantially as and for the purpose described.

16. A drying apparatus comprising a receptacle for receiving the material to be dried, a revoluble filtering body having a portion of its periphery movable into engagement with the material, an agitator movable in opposite directions in the moist material in the receptacle, in a plane substantially concentric with the surface of the filtering body in contact with said material and in proximity to said surface, and driving means connected to the revoluble filtering body and the agitator for simultaneously actuating said filtering body and agitator, substantially as and for the purpose set forth.

17. A drying apparatus comprising a receptacle for receiving the material to be dried, a filtering body provided with a trunnion and having a portion of its surface movable into engagement with the material, and a movable agitator mounted on the trunnion, substantially as and for the purpose specified.

18. A drying apparatus comprising a receptacle for receiving the material to be dried, a filtering body having a portion of its surface movable into engagement with the material, an oscillating frame, and an agitator supported by the frame and movable in the material in the receptacle, said agitator consisting of longitudinal bars and cross-bars interposed one in advance of the other between the longitudinal bars, substantially as and for the purpose described.

19. A drying apparatus comprising a receptacle for receiving the material to be dried, a filtering body having a portion of its surface movable into engagement with the material, and an automatically movable gage for removing the excess of material from said surface, substantially as and for the purpose set forth.

20. A drying apparatus comprising a receptacle for receiving the moist material to be dried, a filtering body partially surrounded by a drying fluid and having a portion of its surface movable into engagement with said material, means for withdrawing a given amount by weight of the liquid in the moist material and of the drying fluid from the inner side of the filtering surface at a greater speed than a similar amount of said liquid and drying fluid feeds through the filtering surface from the outer side thereof and thereby maintaining a portion of the material on said filtering surface and drying said portion of the material, a gage movable in the moist material in the receptacle in a plane substantially concentric with the surface of the filtering body in contact with said material and in proximity to said surface, and means for removing the dried material from the filtering surface of said filtering body, substantially as and for the purpose specified.

21. A drying apparatus comprising a receptacle for receiving the material to be dried, a filtering body having a portion of its surface movable into engagement with the material, an automatically movable gage for removing the excess of material from said surface, and an oscillating frame for supporting said gage, substantially as and for the purpose described.

22. A drying apparatus comprising a receptacle for receiving the material to be dried, a filtering body having a portion of its surface movable into engagement with the material, an automatically movable gage for removing the excess of material from said surface, an oscillating frame for supporting said gage, and means for adjusting the position of the gage, substantially as and for the purpose set forth.

In testimony whereof I have hereunto signed my name in the presence of two attesting witnesses, at Syracuse, in the county of Onondaga in the State of New York, this 7th day of February, 1896.

EDWARD N. TRUMP.

Witnesses:
K. H. THEOBALD,
E. A. WEISBURG.